(12) United States Patent
Govardhanam

(10) Patent No.: US 12,717,038 B2
(45) Date of Patent: Aug. 25, 2026

(54) SURFEL OBJECT REPRESENTATION IN SIMULATED ENVIRONMENT

(71) Applicant: GM Cruise Holdings LLC, San Francisco, CA (US)

(72) Inventor: Hariprasad Govardhanam, Fremont, CA (US)

(73) Assignee: GM Cruise Holdings LLC, San Francisco, CA (US)

( * ) Notice: Subject to any disclaimer, the term of this patent is extended or adjusted under 35 U.S.C. 154(b) by 898 days.

(21) Appl. No.: 18/093,310

(22) Filed: Jan. 4, 2023

(65) Prior Publication Data

US 2024/0219569 A1 Jul. 4, 2024

(51) Int. Cl.

*G01S 17/89* (2020.01)
*G01S 17/931* (2020.01)
*G06T 15/00* (2011.01)

(52) U.S. Cl.

CPC ............ *G01S 17/89* (2013.01); *G01S 17/931* (2020.01); *G06T 15/005* (2013.01)

(58) Field of Classification Search

None

See application file for complete search history.

(56) References Cited

U.S. PATENT DOCUMENTS

2021/0286068 A1* 9/2021 Kumar ................... G09B 9/006
2022/0063662 A1* 3/2022 Sprunk .................. G06V 20/58
2022/0326382 A1* 10/2022 Wang ...................... G01S 17/10

* cited by examiner

*Primary Examiner* — Luke D Ratcliffe
(74) *Attorney, Agent, or Firm* — Honigman LLP; Matthew H. Szalach

(57) ABSTRACT

The disclosed technology provides solutions for improving virtual object representation in a simulated (or virtual) environment and in particular, provides solutions for rendering surfel representations of real-world objects into a simulated environment using point cloud data. In some aspects, the disclosed technology includes a process for receiving a plurality of Light Detection and Ranging (LiDAR) points corresponding with a real-world object, determining, for each of the plurality of LiDAR points, an image texture based on the real-world object, and generating a surfel object representing the real-world object. In some aspects, the process further includes steps for inserting the surfel object into a simulated three-dimensional (3D) environment. Systems and machine-readable media are also provided.

20 Claims, 5 Drawing Sheets

SURFEL OBJECT REPRESENTATION IN SIMULATED ENVIRONMENT

BACKGROUND

1. Technical Field

The present disclosure generally provides solutions for improving object representation in a simulated (or virtual) environment and in particular, provides solutions for rendering surfel representations of real-world objects into a simulated environment using sensor data.

2. Introduction

Autonomous vehicles (AVs) are vehicles having computers and control systems that perform driving and navigation tasks that are conventionally performed by a human driver. As AV technologies continue to advance, they will be increasingly used to improve transportation efficiency and safety. As such, AVs will need to perform many of the functions that are conventionally performed by human drivers, such as performing navigation and routing tasks necessary to provide safe and efficient transportation. Such tasks may require the collection and processing of large quantities of data using various sensor types, including but not limited to cameras, Light Detection and Ranging (LiDAR) sensors, and/or Radio Detection and Ranging (RADAR) disposed on the AV. In some instances, the collected data can be used to generate (or render) simulated (or synthetic/virtual) environments that can be used to perform additional AV testing and training.

BRIEF DESCRIPTION OF THE DRAWINGS

The various advantages and features of the present technology will become apparent by reference to specific implementations illustrated in the appended drawings. A person of ordinary skill in the art will understand that these drawings only show some examples of the present technology and would not limit the scope of the present technology to these examples. Furthermore, the skilled artisan will appreciate the principles of the present technology as described and explained with additional specificity and detail through the use of the accompanying drawings in which.

DETAILED DESCRIPTION

Figure 1:
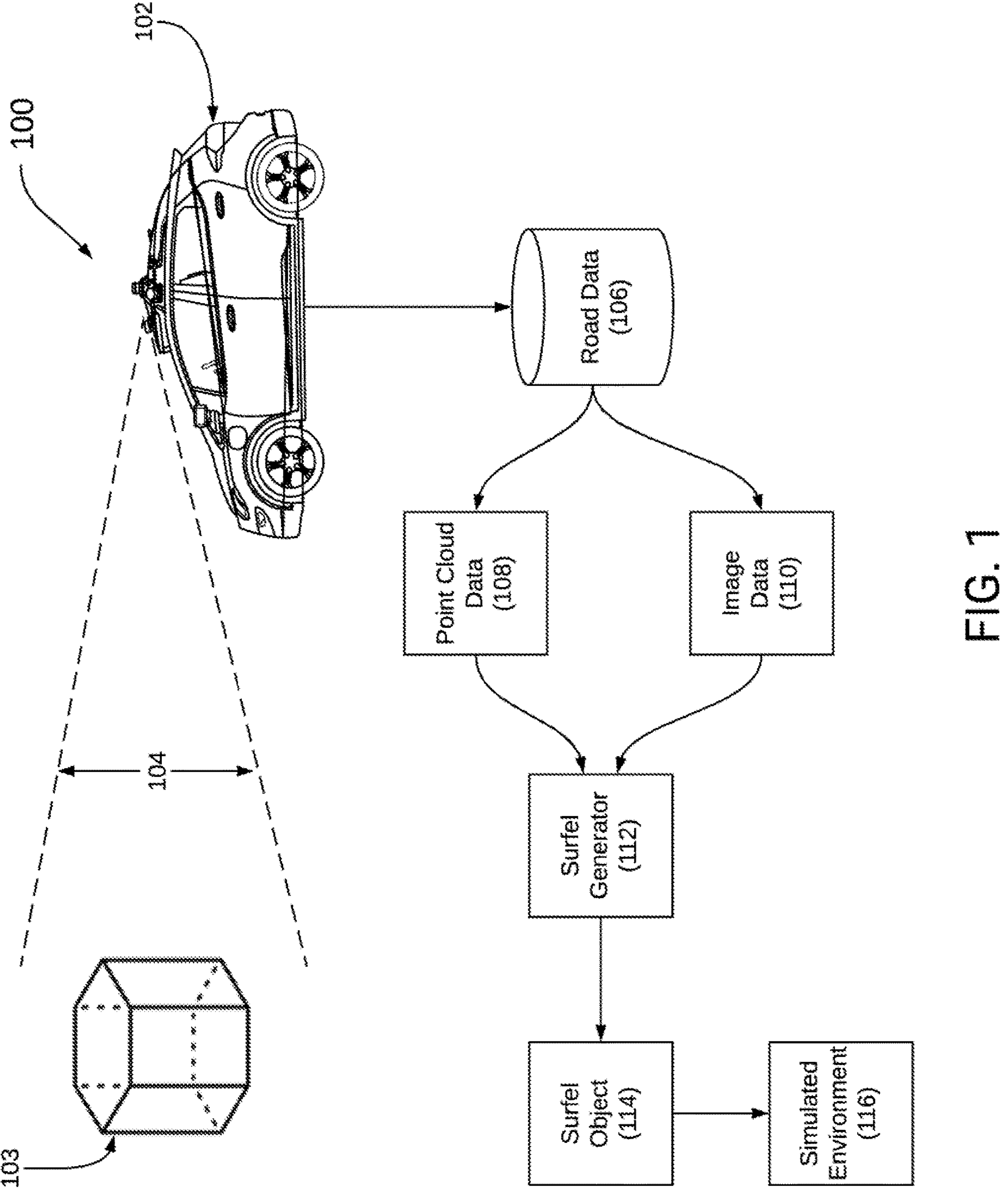
FIG. 1 illustrates an example system that can be used to render sensor point cloud data into a surfel object for insertion into a simulated environment, according to some examples of the present disclosure.

The detailed description set forth below is intended as a description of various configurations of the subject technology and is not intended to represent the only configurations in which the subject technology can be practiced. The appended drawings are incorporated herein and constitute a part of the detailed description. The detailed description includes specific details for the purpose of providing a more thorough understanding of the subject technology. However, it will be clear and apparent that the subject technology is not limited to the specific details set forth herein and may be practiced without these details. In some instances, structures and components are shown in block diagram form to avoid obscuring the concepts of the subject technology.

Some aspects of the present technology may relate to the gathering and use of data available from various sources to improve safety, quality, and experience. The present disclosure contemplates that in some instances, this gathered data may include personal information. The present disclosure contemplates that the entities involved with such personal information respect and value privacy policies and practices.

One barrier to improving the safety and performance of autonomous vehicles (AVs) is acquiring enough quality training data to adequately train and optimize the AV software stack. For example, large quantities of data are typically needed to refine machine-learning (ML) models used to implement AV perception, prediction, planning and/or control functions. One approach for acquiring adequate training data is to simulate AV operations in a simulated (or virtual) environment, and to collect data for virtually scenarios using emulated (simulated) AV sensors. The simulated sensor data can provide useful information about the performance of various AV perception and reasoning systems, and can be particularly useful if/when the simulated AV environments accurately mimic those that AVs are likely to encounter in the real-world. Additionally, training and testing performed in the simulated environment is typically most useful when the simulated environment (also referred to herein as SIM environment) accurately represents characteristics of the real-world, such as through the accurate representation of objects (e.g., terrain, buildings, road signs, etc.) and entities (e.g., other vehicles, pedestrians, etc.), in the scene.

In some approaches, objects rendered into a simulated environment can be based on three-dimensional (3D) objects for which sensor data has been collected in a real-world environment. For example, simulated objects can be based on sensor data collected from one or more Light Detection and Ranging (LiDAR) sensors, time-of-flight (ToF) sensors, Radio Detection and Ranging (RADAR) sensors, high-definition LiDAR sensors, camera image sensors, and the like. However, it is often difficult to accurately model real-world objects from collected AV sensor data because the sensor data is not geometrically complete, e.g., the collected sensor data often does not represent all object surfaces. Additionally, it can be difficult to accurately model real-world objects such that sensor point cloud data collected in a simulated environment (e.g., by simulated/emulated LiDAR and/or RADAR sensors, etc.) corresponds with point cloud data collected by physical sensors for the corresponding object in the real world.

Aspects of the disclosed technology provide solutions improving virtual representations of real-world objects in a simulated environment. The virtual (or simulated) objects can be rendered as surface elements (also referred to herein as surfel objects) using point cloud sensor data collected for corresponding real-world objects, for example, using one or more AV sensors (e.g., LiDAR and/or RADAR sensors). In some instances, the surfel objects can be inserted into a simulated environment (also referred to herein as a SIM environment) along with other virtual (non-surfel) objects. As discussed in further detail below, surfel objects can be used in computer graphics as an alternative to polygonal modeling, wherein a surfel object is represented by a set of points or viewer-facing discs that have color, texture and/or lighting information. As such, surfel objects can be suited for modeling dynamic geometries, because there is no need to compute topology information such as adjacency lists. When viewed from the same or a similar view angle as the collected point cloud data, surfel object can provide more realistic representations of 3D objects in the simulated environment. As discussed in further detail below, surfel objects can be represented using image-discs of various color, brightness and/or texture properties, for example, that can be oriented using normal vectors for a corresponding location on an object surface.

FIG. 1 illustrates an example system 100 for rendering point cloud data into surfel object representations for insertion into a simulated environment. System 100 includes an autonomous vehicle (AV) 102 that is configured to collect and store data about a surrounding environment, such as an environment including real-world object 103 that is within a field-of-view 104 of one or more AV sensors. The sensors of AV 102 can include one or more sensors of various modalities, including but not limited to one or more LiDAR, RADAR, and/or camera sensors. The environmental data collected by AV 102, including the collected sensor data, as well as other types of location and map metadata, can be stored as road data 106.

Road data 106 can be parsed to separate point cloud data 108, such as LiDAR and/or RADAR sensor data from other types of data, such as image data 110. Subsequently, point cloud data 108 and image data 110 can be provided to a surfel generation process, such as surfel generator 112. Surfel generator 112 can be configured to generate surfel points (or surfel discs) corresponding with each point in the point cloud, e.g., for a corresponding location on the object's surface. By way of example, surfel discs can be represented for each LiDAR (or RADAR) point collected for real-world object 103 by one or more LiDAR (or RADAR) sensors of AV 102. As such, the location of each surfel disc can correspond with the location of the corresponding LiDAR/RADAR point on the surface of real-world object 103.

Each surfel disc can include lighting, color and/or texture information, for example, that can be derived for the corresponding location on real-world object 103 using image data 110, received by surfel generator 112. For example, image information (e.g., pixel information) for a corresponding location on the object surface can be used to generate lighting, texture and/or color properties for a given surfel disc. As such, the resulting surfel object 114 can include a number of surfel discs, each of which include lighting, texture, and/or color properties for the corresponding location on real-world object 103. In some implementations, to extract the lighting, texture and/or color properties (or texture information), the point cloud data (from LiDAR/RADAR) can be projected or mapped onto image space and color/lighting/texture information can be extracted from a pixel region around the projected point. The extracted image information can then be incorporated into the surfel description. Additionally, in some approaches, for each surfel disk, a normal vector associated with a corresponding surface location on the real-world object can be determined, for example, to define a view-angle at which the surfel disc can be viewed, e.g., after the surfel object has been inserted into/placed within a simulated environment.

In some instances, point cloud data 108 (e.g., LiDAR or RADAR points) may be down sampled before being provided to surfel generator 112. For example, if the number of LiDAR/RADAR data points collected for real-world object are to enumerate, (e.g., because object 103 is close to AV 102 when data collection occurs), downsampling can be performed to increase data sparsity, thereby lowering the processing/compute loads required by surfel generator 112 to produce surfel object 114.

In some aspects, objects that are too distant from the AV sensors, e.g., in FOV 104 may not be rendered as a surfel object, for example, because the point cloud data corresponding with those objects is too sparse. In other implementations, point cloud data that represents an object may not be used to render a surfel object if the point cloud data is too noisy. As such, decisions regarding what objects in the surrounding environment of AV 102 are to be rendered as surfel objects can be based on distance metrics and/or based point-cloud data (noise) metrics. By way of example, objects may not be rendered into surfel objects if they are beyond a predetermined distance (e.g., a predetermined distance threshold) from the AV, if the point cloud data points are associated with noise about a predetermined threshold (e.g., a predetermined noise threshold), and/or if the number of point cloud data points corresponding with the object is below a predetermined threshold (e.g., a predetermined point cloud sparsity threshold). In some aspects, a number of point cloud data points collected for a given object may be too numerous, in which case the point cloud data may be down sampled, for example, to reduce compute loads needed to render the corresponding surfel object.

Surfel object 114 can then be placed in a simulated environment 116 and used as a virtual (or simulated) representation of real-world object 103. In some examples, simulated environment 116 can include various non-surfel objects, such as 3D virtual objects that are geometrically complete depictions of the objects they represent. For example, in some instances, surfel object 114 may provide a more realistic (or accurate) representation of real-world object 103, for example, if viewed from similar angles (within simulated environment 116) as those represented by sensor data captured in field-of-view 104. In contrast, geometrically complete 3D objects may be less accurate reproductions of the real-world objects that they represent, but can be viewed from any view angle within the simulated environment. As such, simulated environment 116 can include surfel objects and non-surfel objects used to create various driving scenarios that can be used for AV testing and training.

Figure 2:
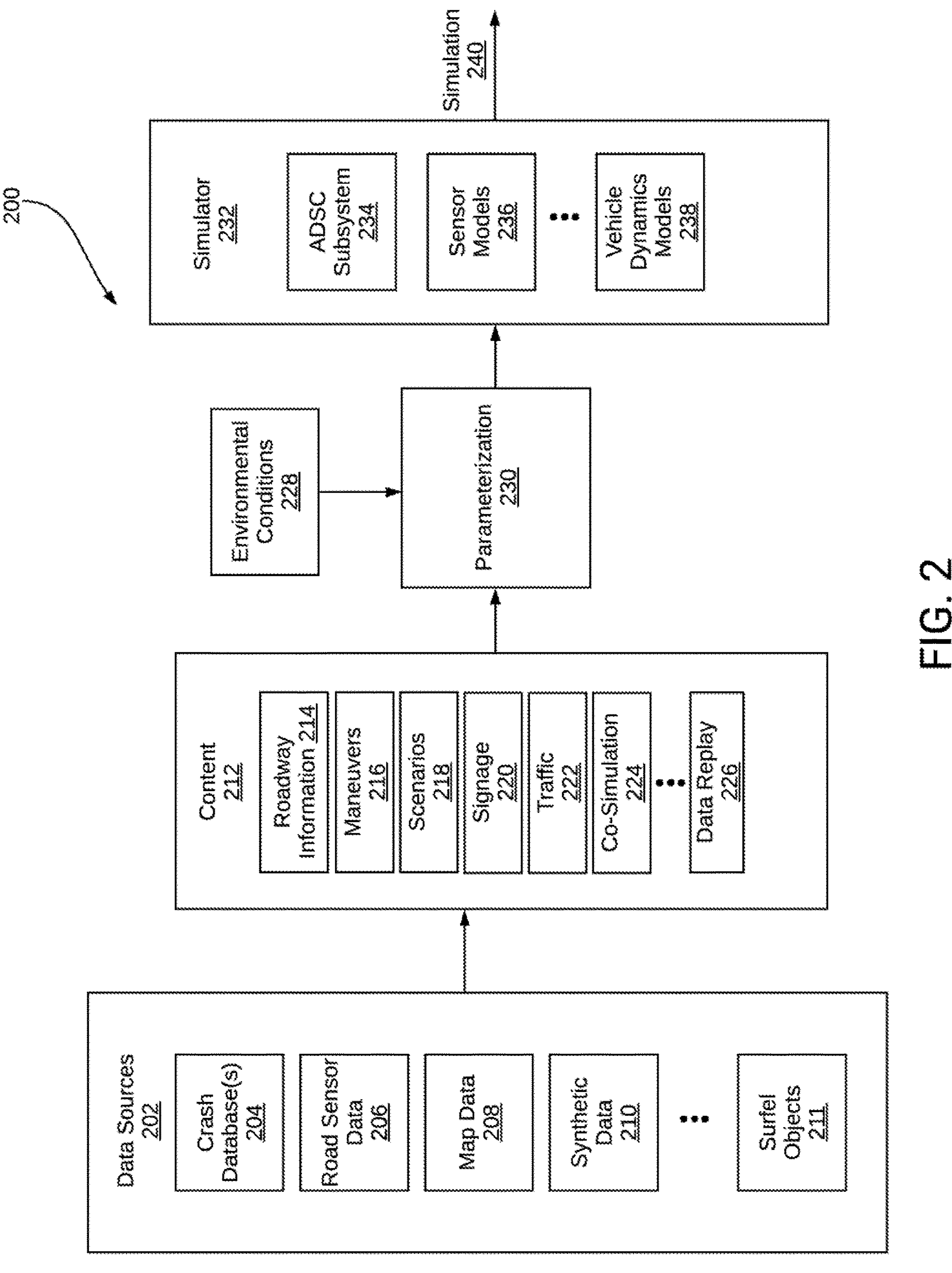
FIG. 2 illustrates an example system that can be used for rendering simulated environments for use in autonomous vehicle (AV) testing and training, according to some aspects of the disclosed technology.

FIG. 2 is a diagram illustrating an example simulation framework 200, according to some examples of the present disclosure. Simulation framework 200 can include data sources 202, content 212, environmental conditions 228, parameterization 230, and simulator 232. The components in the example simulation framework 200 are illustrative examples provided for explanation purposes; it is understood that in other implementations, simulation framework 200 may include additional (or fewer) components not shown in FIG. 2.

Any (or all of) data sources 202 can be used to create a simulation 240, for example, that can be used to test and/or train various AV systems. Data sources 202 can include, for example and without limitation, one or more crash databases 204, road sensor data 206, map data 208, and/or synthetic data 210. In other examples, data sources 202 can include more or less sources than shown in FIG. 2 and/or one or more data sources that are not shown in FIG. 2.

Crash databases 204 can include crash data (e.g., data describing crashes and/or associated details) generated by vehicles involved in crashes. The road sensor data 206 can include road data (e.g., road data 106) collected by one or more sensors (e.g., one or more camera sensors, LIDAR sensors, RADAR sensors, SONAR sensors, IMU sensors, GPS/GNSS receivers, and/or any other sensors) of one or more vehicles while the one or more vehicles drive/navigate one or more real-world environments. Map data 208 can include one or more maps (and, in some cases, associated data) such as, for example and without limitation, one or more high-definition (HD) maps, sensor maps, scene maps, and/or any other maps. In some examples, the HD maps can include roadway information such as, for example, lane widths, location of road signs and traffic lights, directions of travel for each lane, road junction information, speed limit information, etc.

Synthetic data 210 can include virtual assets, objects, and/or elements created for a simulated scene, a virtual scene and/or virtual scene elements, and/or any other synthetic data elements. For example, in some cases, synthetic data 210 can include virtual representations of real-world objects represented by road sensor data 206, including but not limited to one or more virtual vehicles, virtual pedestrians, virtual roads, virtual objects, virtual environments/scenes, virtual signs, virtual backgrounds, virtual buildings, virtual trees, virtual motorcycles/bicycles, virtual obstacles, virtual environmental elements (e.g., weather, lightening, shadows, etc.), virtual surfaces, etc.

Data sources 202 can also include one or more surfel objects 211, such as those rendered from point cloud data, for example represented as road sensor data 206, that has been collected by one or more physical sensors. Surfel objects 211 can be combined with other virtual objects (e.g., using synthetic data 210) in order to populate a simulated environment (simulation 240) with one or more virtual objects. As discussed above, surfel objects 200 can be generated from point cloud data (e.g., LiDAR and/or RADAR sensor data) and image data using a surfel generation process that is configured to generate surfel points (or surfel discs) corresponding with each point in the point cloud, e.g., for a corresponding location on a surface of a real-world object. By way of example, surfel discs can be represented for each LiDAR (or RADAR) point collected for real-world object by one or more LiDAR (or RADAR) sensors of an AV (e.g., AV 102). As such, the location of each surfel disc can correspond with the location of the corresponding LiDAR/RADAR point on the surface of the real-world object, and can include lighting, color and/or texture information, for example, that can be derived for the corresponding location on the real-world object using the image data. For example, image information (e.g., pixel information) for a corresponding location on the object surface can be used to generate lighting, texture and/or color properties for a given surfel disc. As such, the resulting surfel object can include a number of surfel discs, each of which include lighting, texture, and/or color properties for the corresponding location on real-world object 103. In some implementations, to extract the lighting, texture and/or color properties (or texture information), the point cloud data (from LiDAR/RADAR) can be projected or mapped onto image space and color/lighting/texture information can be extracted from a pixel region around the projected point. The extracted image information can then be incorporated into the surfel description.

Data from one or more of data sources 202 can be used to create content 212. Content 212 can include static content and/or dynamic content. For example, content 212 can include roadway information 214, maneuvers 216, scenarios 218, signage 220, traffic 222, co-simulation 224, and/or data replay 226. Roadway information 214 can include, for example, lane information (e.g., number of lanes, lane widths, and/or directions of travel, for each lane, etc.), the location and information of road signs and/or traffic lights, road junction information, speed limit information, road attributes (e.g., surfaces, angles of inclination, curvatures, obstacles, etc.), road topologies, and/or other roadway information. Maneuvers 216 can include any AV maneuvers, and the scenarios 218 can include specific AV behaviors in certain AV scenes/environments. Objects 220 can include signs such as, for example, traffic lights, road signs, billboards, displayed messages on the road, etc. The traffic 222 can include any traffic information such as, for example, traffic density, traffic fluctuations, traffic patterns, traffic activity, delays, positions of traffic, velocities, volumes of vehicles in traffic, geometries or footprints of vehicles, pedestrians, spaces (occupied and/or unoccupied), etc.

The co-simulation 224 can include a distributed modeling and simulation of different AV subsystems that form the larger AV system. In some cases, co-simulation 224 can include information for connecting separate simulations together with interactive communications. In some cases, co-simulation 224 can allow for modeling to be done at a subsystem level while providing interfaces to connect the subsystems to the rest of the system (e.g., the autonomous driving system computer). Moreover, data replay 226 can include replay content produced from real-world sensor data (e.g., road sensor data 206).

Environmental conditions 228 can include any information about environmental conditions 228. For example, the environmental conditions 228 can include atmospheric conditions, road/terrain conditions (e.g., surface slope or gradient, surface geometry, surface coefficient of friction, road obstacles, etc.), illumination, weather, road and/or scene conditions resulting from one or more environmental conditions, etc.

Content 212 and the environmental conditions 228 can be used to create the parameterization 230. The parameterization 230 can include parameter ranges, parameterized scenarios, probability density functions of one or more parameters, sampled parameter values, parameter spaces to be tested, evaluation windows for evaluating a behavior of an AV in a simulation, scene parameters, content parameters, environmental parameters, etc. The parameterization 230 can be used by a simulator 232 to generate a simulation 240.

Simulator 232 can include a software engine(s), algorithm(s), neural network model(s), and/or software component(s) used to generate simulations, such as simulation 240. In some examples, the simulator 232 can include ADSC/subsystem models 234, sensor models 236, and a vehicle dynamics model 238. The ADSC/subsystem models 234 can include models, descriptors, and/or interfaces for the autonomous driving system computer (ADSC) and/or ADSC subsystems such as, for example, a perception stack (e.g., perception stack 412), a localization stack (e.g., localization stack 414), a prediction stack (e.g., prediction stack 416), a planning stack (e.g., planning stack 418), a communications stack (e.g., communications stack 420), a control stack (e.g., control stack 422), a sensor system(s), and/or any other subsystems.

Sensor models 236 can include mathematical representations of hardware sensors and an operation (e.g., sensor data processing) of one or more sensors (e.g., a LIDAR, a RADAR, a SONAR, a camera sensor, an IMU, and/or any other sensor). The vehicle dynamics model 238 can model vehicle behaviors/operations, vehicle attributes, vehicle trajectories, vehicle positions, etc.

Figure 3:
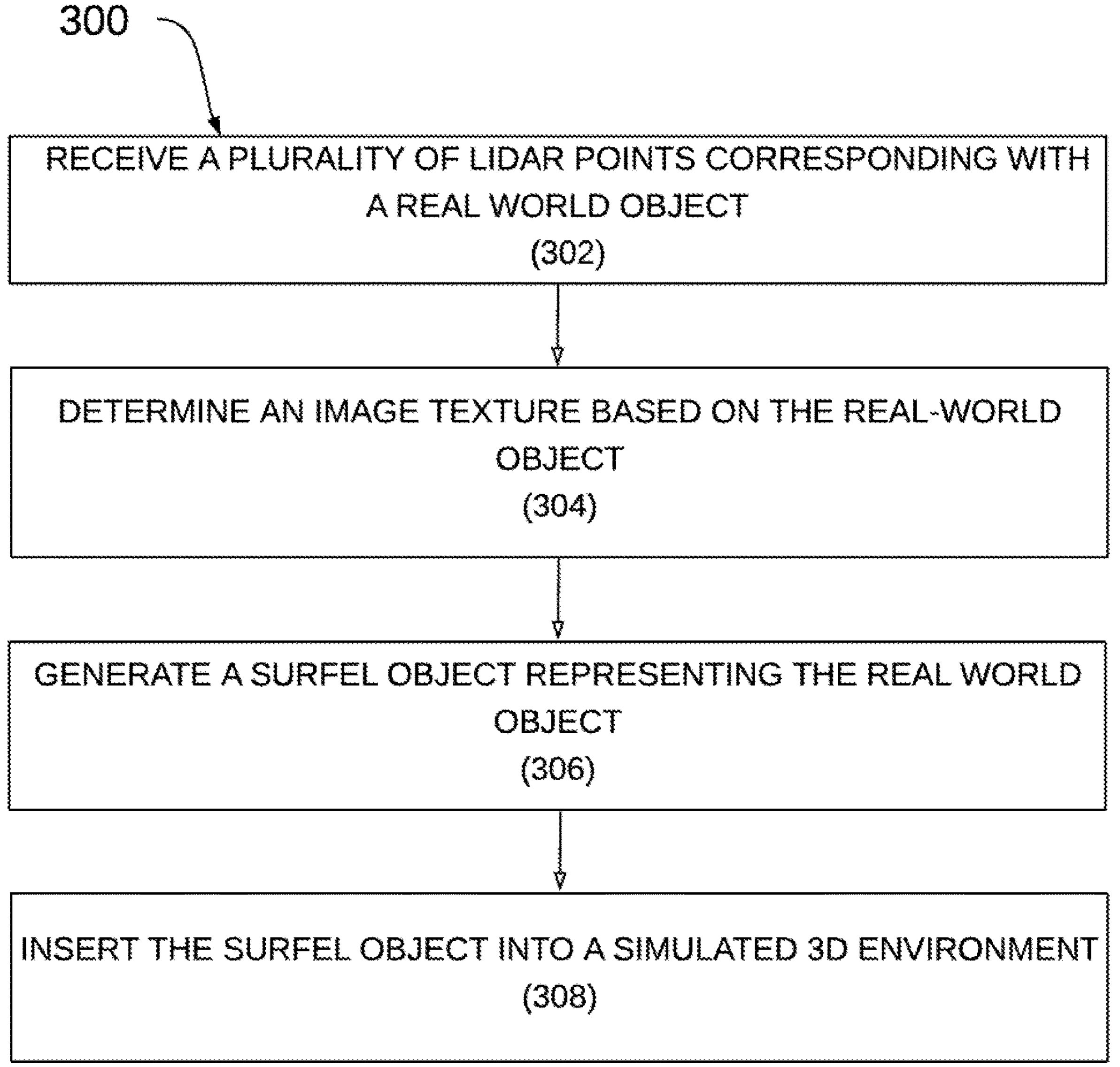
FIG. 3 illustrates an example process for generating surfel objects from point cloud data, according to some aspects of the disclosed technology.

FIG. 3 illustrates an example process 300 for generating surfel objects from point cloud data. At step 302, process 300 can include receiving a plurality of Light Detection and Ranging (LiDAR) points corresponding with a real-world object. As discussed above, point cloud data can include LiDAR (and/or RADAR) data that is collected for a real-world object by one or more AV sensors. Depending on the desired implementation, point cloud data from other sensor modalities may be used, without departing from the scope of the disclosed technology.

At step 304, process 300 can include determining, for each of the plurality of LiDAR points, an image texture based on the real-world object. Determinations of image textures or other image properties, such as lighting and/or color etc., can be performed by mapping the point cloud data points (e.g., LiDAR data points) onto the image representing the real-world object. Image properties, such as image texture, color and/or lighting, etc. can be determined based on pixel regions that correspond with each point cloud data point. By way of example, image texture, color, and/or lighting can be determined for a given LiDAR point by taking averages (or sampling values from) one or more image pixels at (or proximate to) the corresponding image location.

At step 306, process 300 can include generating a surfel object representing the real-world object, wherein the surfel object is based on the plurality of LiDAR points and the image texture determined for each of the plurality of LiDAR points. As discussed above, decisions regarding what objects can be rendered as surfel objects can be based on distance metrics and/or based point-cloud data (noise) metrics. By way of example, objects may not be rendered into surfel objects if they are beyond a predetermined distance (e.g., a predetermined distance threshold) from the AV, if the point cloud data points are associated with noise about a predetermined threshold (e.g., a predetermined noise threshold), and/or if the number of point cloud data points corresponding with the object is below a predetermined threshold (e.g., a predetermined point cloud sparsity threshold). In some aspects, a number of point cloud data points collected for a given object may be too numerous, in which case the point cloud data may be down sampled, for example, to reduce compute loads needed to render the corresponding surfel object.

At step 308, process 300 can include inserting the surfel object into a simulated three-dimensional (3D) environment. The simulated environment (e.g., simulation 240) can be used to train and/or test various AV systems. By way of example, sufel and non-surfel objects placed in the simulated environment can be used to test and train perception systems of an AV software stack. Once training has been completed, changes/updates to the AV software stack (such as updates to one or more machine-learning models therein) can be used to update software of a physical AV before it is deployed into operation in a real-world environment, such as by providing a ride-hailing service in San Jose, California.

Figure 4:
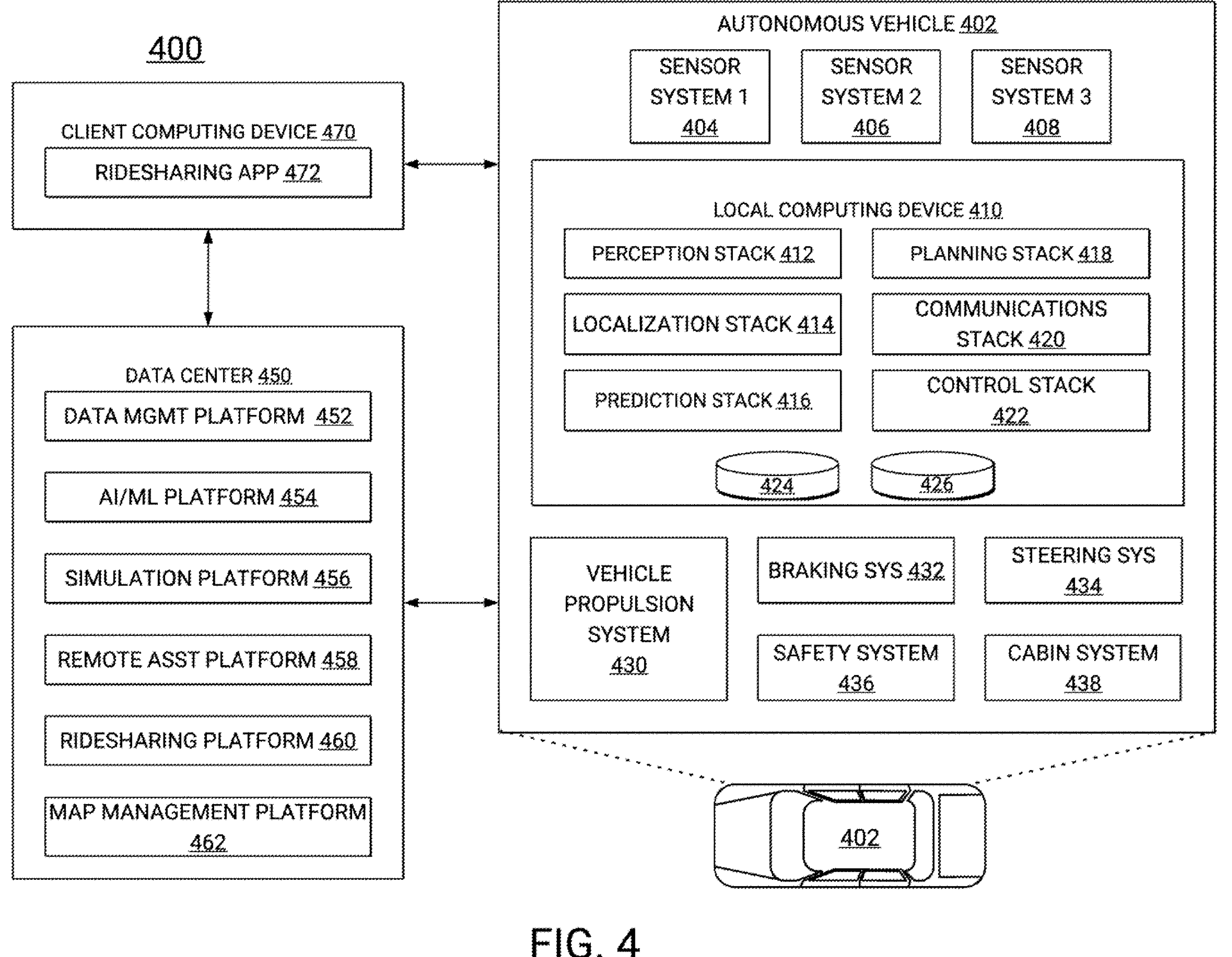
FIG. 4 illustrates an example system environment that can be used to facilitate autonomous vehicle (AV) dispatch and operations, according to some aspects of the disclosed technology.

FIG. 4 is a diagram illustrating an example autonomous vehicle (AV) environment 400, according to some examples of the present disclosure. One of ordinary skill in the art will understand that, for the AV environment 400 and any system discussed in the present disclosure, there can be additional or fewer components in similar or alternative configurations. The illustrations and examples provided in the present disclosure are for conciseness and clarity. Other examples may include different numbers and/or types of elements, but one of ordinary skill the art will appreciate that such variations do not depart from the scope of the present disclosure.

In this example, the AV environment 400 includes an AV 402, a data center 450, and a client computing device 470. The AV 402, the data center 450, and the client computing device 470 can communicate with one another over one or more networks (not shown), such as a public network (e.g., the Internet, an Infrastructure as a Service (IaaS) network, a Platform as a Service (PaaS) network, a Software as a Service (SaaS) network, other Cloud Service Provider (CSP) network, etc.), a private network (e.g., a Local Area Network (LAN), a private cloud, a Virtual Private Network (VPN), etc.), and/or a hybrid network (e.g., a multi-cloud or hybrid cloud network, etc.).

The AV 402 can navigate roadways without a human driver based on sensor signals generated by multiple sensor systems 404, 406, and 408. The sensor systems 404-408 can include one or more types of sensors and can be arranged about the AV 402. For instance, the sensor systems 404-408 can include Inertial Measurement Units (IMUs), cameras (e.g., still image cameras, video cameras, etc.), light sensors (e.g., LIDAR systems, ambient light sensors, infrared sensors, etc.), RADAR systems, GPS receivers, audio sensors (e.g., microphones, Sound Navigation and Ranging (SONAR) systems, ultrasonic sensors, etc.), engine sensors, speedometers, tachometers, odometers, altimeters, tilt sensors, impact sensors, airbag sensors, seat occupancy sensors, open/closed door sensors, tire pressure sensors, rain sensors, and so forth. For example, the sensor system 404 can be a camera system, the sensor system 406 can be a LIDAR system, and the sensor system 408 can be a RADAR system. Other examples may include any other number and type of sensors.

The AV 402 can also include several mechanical systems that can be used to maneuver or operate the AV 402. For instance, mechanical systems can include a vehicle propulsion system 430, a braking system 432, a steering system 434, a safety system 436, and a cabin system 438, among other systems. The vehicle propulsion system 430 can include an electric motor, an internal combustion engine, or both. The braking system 432 can include an engine brake, brake pads, actuators, and/or any other suitable componentry configured to assist in decelerating the AV 402. The steering system 434 can include suitable componentry configured to control the direction of movement of the AV 402 during navigation. The safety system 436 can include lights and signal indicators, a parking brake, airbags, and so forth. The cabin system 438 can include cabin temperature control systems, in-cabin entertainment systems, and so forth. In some examples, the AV 402 might not include human driver actuators (e.g., steering wheel, handbrake, foot brake pedal, foot accelerator pedal, turn signal lever, window wipers, etc.) for controlling the AV 402. Instead, the cabin system 438 can include one or more client interfaces (e.g., Graphical User Interfaces (GUIs), Voice User Interfaces (VUIs), etc.) for controlling certain aspects of the mechanical systems 430-438.

The AV 402 can include a local computing device 410 that is in communication with the sensor systems 404-408, the mechanical systems 430-438, the data center 450, and the client computing device 470, among other systems. The local computing device 410 can include one or more processors and memory, including instructions that can be executed by the one or more processors. The instructions can make up one or more software stacks or components responsible for controlling the AV 402; communicating with the data center 450, the client computing device 470, and other systems; receiving inputs from riders, passengers, and other entities within the AV's environment; logging metrics collected by the sensor systems 404-408; and so forth. In this example, the local computing device 410 includes a perception stack 412, a localization stack 414, a prediction stack 416, a planning stack 418, a communications stack 420, a control stack 422, an AV operational database 424, and an HD geospatial database 426, among other stacks and systems.

The perception stack 412 can enable the AV 402 to "see" (e.g., via cameras, LIDAR sensors, infrared sensors, etc.), "hear" (e.g., via microphones, ultrasonic sensors, RADAR, etc.), and "feel" (e.g., pressure sensors, force sensors, impact sensors, etc.) its environment using information from the sensor systems 404-408, the localization stack 414, the HD geospatial database 426, other components of the AV, and other data sources (e.g., the data center 450, the client computing device 470, third party data sources, etc.). The perception stack 412 can detect and classify objects and determine their current locations, speeds, directions, and the like. In addition, the perception stack 412 can determine the free space around the AV 402 (e.g., to maintain a safe distance from other objects, change lanes, park the AV, etc.). The perception stack 412 can identify environmental uncertainties, such as where to look for moving objects, flag areas that may be obscured or blocked from view, and so forth. In some examples, an output of the perception stack 412 can be a bounding area around a perceived object that can be associated with a semantic label that identifies the type of object that is within the bounding area, the kinematic of the object (information about its movement), a tracked path of the object, and a description of the pose of the object (its orientation or heading, etc.).

The localization stack 414 can determine the AV's position and orientation (pose) using different methods from multiple systems (e.g., GPS, IMUs, cameras, LIDAR, RADAR, ultrasonic sensors, the HD geospatial database 426, etc.). For example, in some cases, the AV 402 can compare sensor data captured in real-time by the sensor systems 404-408 to data in the HD geospatial database 426 to determine its precise (e.g., accurate to the order of a few centimeters or less) position and orientation. The AV 402 can focus its search based on sensor data from one or more first sensor systems (e.g., GPS) by matching sensor data from one or more second sensor systems (e.g., LIDAR). If the mapping and localization information from one system is unavailable, the AV 402 can use mapping and localization information from a redundant system and/or from remote data sources.

The prediction stack 416 can receive information from the localization stack 414 and objects identified by the perception stack 412 and predict a future path for the objects. In some examples, the prediction stack 416 can output several likely paths that an object is predicted to take along with a probability associated with each path. For each predicted path, the prediction stack 416 can also output a range of points along the path corresponding to a predicted location of the object along the path at future time intervals along with an expected error value for each of the points that indicates a probabilistic deviation from that point.

The planning stack 418 can determine how to maneuver or operate the AV 402 safely and efficiently in its environment. For example, the planning stack 418 can receive the location, speed, and direction of the AV 402, geospatial data, data regarding objects sharing the road with the AV 402 (e.g., pedestrians, bicycles, vehicles, ambulances, buses, cable cars, trains, traffic lights, lanes, road markings, etc.) or certain events occurring during a trip (e.g., emergency vehicle blaring a siren, intersections, occluded areas, street closures for construction or street repairs, double-parked cars, etc.), traffic rules and other safety standards or practices for the road, user input, and other relevant data for directing the AV 402 from one point to another and outputs from the perception stack 412, localization stack 414, and prediction stack 416. The planning stack 418 can determine multiple sets of one or more mechanical operations that the AV 402 can perform (e.g., go straight at a specified rate of acceleration, including maintaining the same speed or decelerating; turn on the left blinker, decelerate if the AV is above a threshold range for turning, and turn left; turn on the right blinker, accelerate if the AV is stopped or below the threshold range for turning, and turn right; decelerate until completely stopped and reverse; etc.), and select the best one to meet changing road conditions and events. If something unexpected happens, the planning stack 418 can select from multiple backup plans to carry out. For example, while preparing to change lanes to turn right at an intersection, another vehicle may aggressively cut into the destination lane, making the lane change unsafe. The planning stack 418 could have already determined an alternative plan for such an event. Upon its occurrence, it could help direct the AV 402 to go around the block instead of blocking a current lane while waiting for an opening to change lanes.

The control stack 422 can manage the operation of the vehicle propulsion system 430, the braking system 432, the steering system 434, the safety system 436, and the cabin system 438. The control stack 422 can receive sensor signals from the sensor systems 404-408 as well as communicate with other stacks or components of the local computing device 410 or a remote system (e.g., the data center 450) to effectuate operation of the AV 402. For example, the control stack 422 can implement the final path or actions from the multiple paths or actions provided by the planning stack 418. This can involve turning the routes and decisions from the planning stack 418 into commands for the actuators that control the AV's steering, throttle, brake, and drive unit.

The communications stack 420 can transmit and receive signals between the various stacks and other components of the AV 402 and between the AV 402, the data center 450, the client computing device 470, and other remote systems. The communications stack 420 can enable the local computing device 410 to exchange information remotely over a network, such as through an antenna array or interface that can provide a metropolitan WIFI network connection, a mobile or cellular network connection (e.g., Third Generation (3G), Fourth Generation (4G), Long-Term Evolution (LTE), 5th Generation (5G), etc.), and/or other wireless network connection (e.g., License Assisted Access (LAA), Citizens Broadband Radio Service (CBRS), MULTEFIRE, etc.). The communications stack 420 can also facilitate the local exchange of information, such as through a wired connection (e.g., a user's mobile computing device docked in an in-car docking station or connected via Universal Serial Bus (USB), etc.) or a local wireless connection (e.g., Wireless Local Area Network (WLAN), Low Power Wide Area Network (LPWAN), Bluetooth®, infrared, etc.).

HD geospatial database 426 can store HD maps and related data of the streets upon which the AV 402 travels. In some examples, the HD maps and related data can comprise multiple layers, such as an areas layer, a lanes and boundaries layer, an intersections layer, a traffic controls layer, and so forth. The areas layer can include geospatial information indicating geographic areas that are drivable (e.g., roads, parking areas, shoulders, etc.) or not drivable (e.g., medians, sidewalks, buildings, etc.), drivable areas that constitute links or connections (e.g., drivable areas that form the same road) versus intersections (e.g., drivable areas where two or more roads intersect), and so on. The lanes and boundaries layer can include geospatial information of road lanes (e.g., lane centerline, lane boundaries, type of lane boundaries, etc.) and related attributes (e.g., direction of travel, speed limit, lane type, etc.). The lanes and boundaries layer can also include three-dimensional (3D) attributes related to lanes (e.g., slope, elevation, curvature, etc.). The intersections layer can include geospatial information of intersections (e.g., crosswalks, stop lines, turning lane centerlines and/or boundaries, etc.) and related attributes (e.g., permissive, protected/permissive, or protected only left turn lanes; legal or illegal u-turn lanes; permissive or protected only right turn lanes; etc.). The traffic controls lane can include geospatial information of traffic signal lights, traffic signs, and other road objects and related attributes.

AV operational database 424 can store raw AV data generated by the sensor systems 404-408, stacks 412-422, and other components of the AV 402 and/or data received by the AV 402 from remote systems (e.g., the data center 450, the client computing device 470, etc.). In some examples, the raw AV data can include HD LIDAR point cloud data, image data, RADAR data, GPS data, and other sensor data that the data center 450 can use for creating or updating AV geospatial data or for creating simulations of situations encountered by AV 402 for future testing or training of various machine learning algorithms that are incorporated in the local computing device 410.

Data center 450 can include a private cloud (e.g., an enterprise network, a co-location provider network, etc.), a public cloud (e.g., an Infrastructure as a Service (IaaS) network, a Platform as a Service (PaaS) network, a Software as a Service (SaaS) network, or other Cloud Service Provider (CSP) network), a hybrid cloud, a multi-cloud, and/or any other network. Data center 450 can include one or more computing devices remote to the local computing device 410 for managing a fleet of AVs and AV-related services. For example, in addition to managing the AV 402, the data center 450 may also support a ride hailing service (e.g., a ridesharing service), a delivery service, a remote/roadside assistance service, street services (e.g., street mapping, street patrol, street cleaning, street metering, parking reservation, etc.), and the like.

Data center 450 can send and receive various signals to and from the AV 402 and the client computing device 470. These signals can include sensor data captured by the sensor systems 404-408, roadside assistance requests, software updates, ride-hailing/ridesharing pick-up and drop-off instructions, and so forth. In this example, the data center 450 includes a data management platform 452, an Artificial Intelligence/Machine Learning (AI/ML) platform 454, a simulation platform 456, a remote assistance platform 458, and a ride-hailing platform 460, and a map management platform 462, among other systems.

Data management platform 452 can be a "big data" system capable of receiving and transmitting data at high velocities (e.g., near real-time or real-time), processing a large variety of data and storing large volumes of data (e.g., terabytes, petabytes, or more of data). The varieties of data can include data having different structures (e.g., structured, semi-structured, unstructured, etc.), data of different types (e.g., sensor data, mechanical system data, ride-hailing service, map data, audio, video, etc.), data associated with different types of data stores (e.g., relational databases, key-value stores, document databases, graph databases, column-family databases, data analytic stores, search engine databases, time series databases, object stores, file systems, etc.), data originating from different sources (e.g., AVs, enterprise systems, social networks, etc.), data having different rates of change (e.g., batch, streaming, etc.), and/or data having other characteristics. The various platforms and systems of the data center 450 can access data stored by the data management platform 452 to provide their respective services.

AI/ML platform 454 can provide the infrastructure for training and evaluating machine learning algorithms for operating the AV 402, the simulation platform 456, the remote assistance platform 458, the ride-hailing platform 460, the map management platform 462, and other platforms and systems. Using the AI/ML platform 454, data scientists can prepare data sets from the data management platform 452; select, design, and train machine learning models; evaluate, refine, and deploy the models; maintain, monitor, and retrain the models; and so on.

Simulation platform 456 can enable testing and validation of the algorithms, machine learning models, neural networks, and other development efforts for the AV 402, the remote assistance platform 458, the ride-hailing platform 460, the map management platform 462, and other platforms and systems. The simulation platform 456 can replicate a variety of driving environments and/or reproduce real-world scenarios from data captured by the AV 402, including rendering geospatial information and road infrastructure (e.g., streets, lanes, crosswalks, traffic lights, stop signs, etc.) obtained from a cartography platform (e.g., map management platform 462); modeling the behavior of other vehicles, bicycles, pedestrians, and other dynamic elements; simulating inclement weather conditions, different traffic scenarios, and so on.

Remote assistance platform 458 can generate and transmit instructions regarding the operation of the AV 402. For example, in response to an output of the AI/ML platform 454 or other system of the data center 450, the remote assistance platform 458 can prepare instructions for one or more stacks or other components of the AV 402.

Ride-hailing platform 460 can interact with a customer of a ride-hailing service via a ride-hailing application 472 executing on the client computing device 470. The client computing device 470 can be any type of computing system such as, for example and without limitation, a server, desktop computer, laptop computer, tablet computer, smartphone, smart wearable device (e.g., smartwatch, smart eyeglasses or other Head-Mounted Display (HMD), smart ear pods, or other smart in-ear, on-ear, or over-ear device, etc.), gaming system, or any other computing device for accessing the ride-hailing application 472. The client computing device 470 can be a customer's mobile computing device or a computing device integrated with the AV 402 (e.g., the local computing device 410). Ride-hailing platform 460 can receive requests to pick up or drop off from the ride-hailing application 472 and dispatch the AV 402 for the trip.

Map management platform 462 can provide a set of tools for the manipulation and management of geographic and spatial (geospatial) and related attribute data. The data management platform 452 can receive LIDAR point cloud data, image data (e.g., still image, video, etc.), RADAR data, GPS data, and other sensor data (e.g., raw data) from one or more AVs 402, Unmanned Aerial Vehicles (UAVs), satellites, third-party mapping services, and other sources of geospatially referenced data. The raw data can be processed, and map management platform 462 can render base representations (e.g., tiles (2D), bounding volumes (3D), etc.) of the AV geospatial data to enable users to view, query, label, edit, and otherwise interact with the data. Map management platform 462 can manage workflows and tasks for operating on the AV geospatial data. Map management platform 462 can control access to the AV geospatial data, including granting or limiting access to the AV geospatial data based on user-based, role-based, group-based, task-based, and other attribute-based access control mechanisms. Map management platform 462 can provide version control for the AV geospatial data, such as tracking specific changes that (human or machine) map editors have made to the data and to revert changes when necessary. Map management platform 462 can administer release management of the AV geospatial data, including distributing suitable iterations of the data to different users, computing devices, AVs, and other consumers of HD maps. Map management platform 462 can provide analytics regarding the AV geospatial data and related data, such as to generate insights relating to the throughput and quality of mapping tasks.

In some embodiments, the map viewing services of map management platform 462 can be modularized and deployed as part of one or more of the platforms and systems of the data center 450. For example, the AI/ML platform 454 may incorporate the map viewing services for visualizing the effectiveness of various object detection or object classification models, the simulation platform 456 may incorporate the map viewing services for recreating and visualizing certain driving scenarios, the remote assistance platform 458 may incorporate the map viewing services for replaying traffic incidents to facilitate and coordinate aid, the ride-hailing platform 460 may incorporate the map viewing services into the client application 472 to enable passengers to view the AV 402 in transit en route to a pick-up or drop-off location, and so on.

While the autonomous vehicle 402, the local computing device 410, and the autonomous vehicle environment 400 are shown to include certain systems and components, one of ordinary skill will appreciate that the autonomous vehicle 402, the local computing device 410, and/or the autonomous vehicle environment 400 can include more or fewer systems and/or components than those shown in FIG. 4. For example, the autonomous vehicle 402 can include other services than those shown in FIG. 4 and the local computing device 410 can also include, in some instances, one or more memory devices (e.g., RAM, ROM, cache, and/or the like), one or more network interfaces (e.g., wired and/or wireless communications interfaces and the like), and/or other hardware or processing devices that are not shown in FIG. 4. An illustrative example of a computing device and hardware components that can be implemented with the local computing device 410 is described below with respect to FIG. 5.

Figure 5:
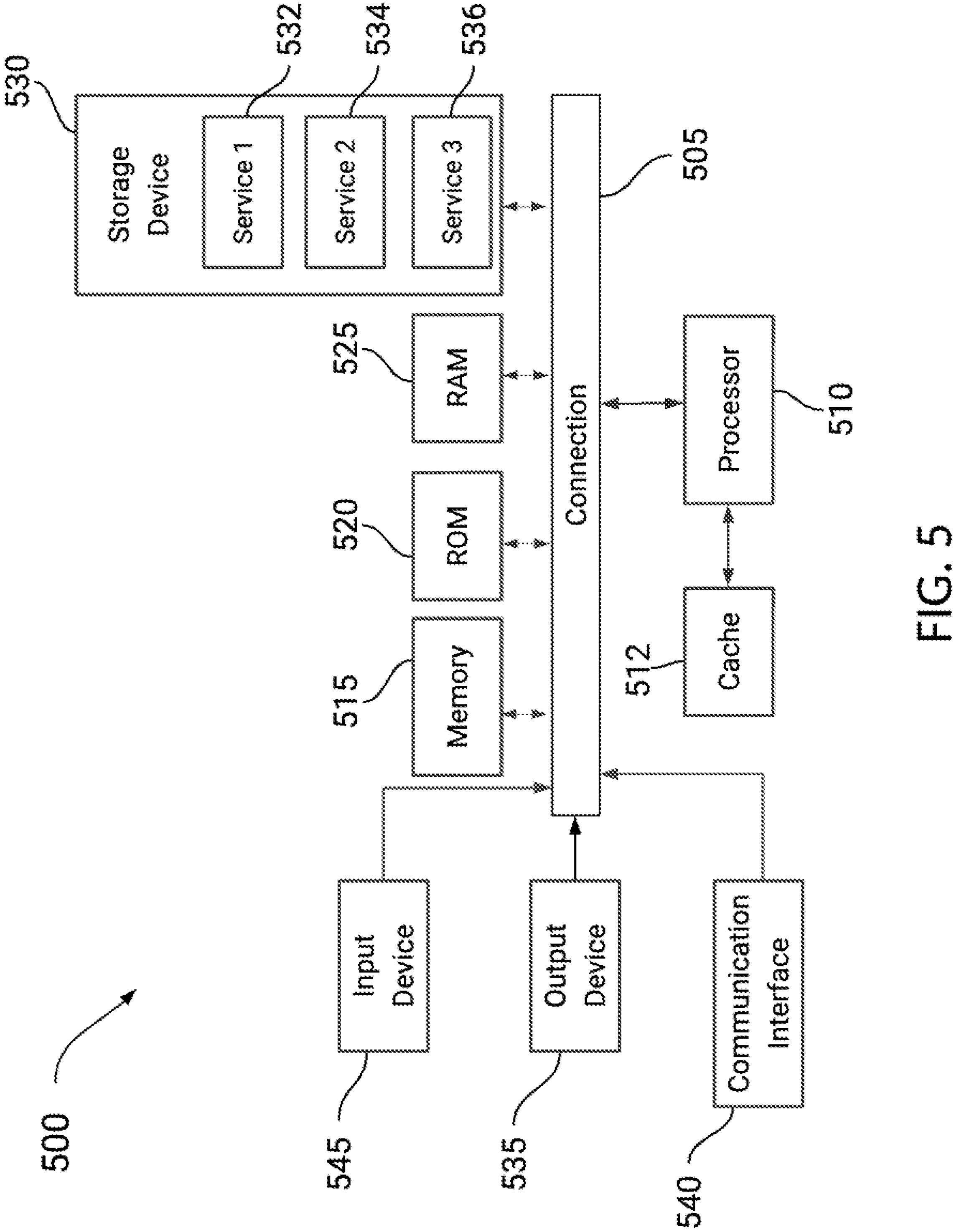
FIG. 5 illustrates an example processor-based system with which some aspects of the subject technology can be implemented.

FIG. 5 illustrates an example processor-based system with which some aspects of the subject technology can be implemented. For example, processor-based system 500 can be any computing device making up, or any component thereof in which the components of the system are in communication with each other using connection 505. Connection 505 can be a physical connection via a bus, or a direct connection into processor 510, such as in a chipset architecture. Connection 505 can also be a virtual connection, networked connection, or logical connection.

In some embodiments, computing system 500 is a distributed system in which the functions described in this disclosure can be distributed within a datacenter, multiple data centers, a peer network, etc. In some embodiments, one or more of the described system components represents many such components each performing some or all of the function for which the component is described. In some embodiments, the components can be physical or virtual devices.

Example system 500 includes at least one processing unit (Central Processing Unit (CPU) or processor) 510 and connection 505 that couples various system components including system memory 515, such as Read-Only Memory (ROM) 520 and Random-Access Memory (RAM) 525 to processor 510. Computing system 500 can include a cache of high-speed memory 512 connected directly with, in close proximity to, or integrated as part of processor 510.

Processor 510 can include any general-purpose processor and a hardware service or software service, such as services 532, 534, and 536 stored in storage device 530, configured to control processor 510 as well as a special-purpose processor where software instructions are incorporated into the actual processor design. Processor 510 may essentially be a completely self-contained computing system, containing multiple cores or processors, a bus, memory controller, cache, etc. A multi-core processor may be symmetric or asymmetric.

To enable user interaction, computing system 500 includes an input device 545, which can represent any number of input mechanisms, such as a microphone for speech, a touch-sensitive screen for gesture or graphical input, keyboard, mouse, motion input, speech, etc. Computing system 500 can also include output device 535, which can be one or more of several output mechanisms known to those of skill in the art. In some instances, multimodal systems can enable a user to provide multiple types of input/output to communicate with computing system 500. Computing system 500 can include communications interface 540, which can generally govern and manage the user input and system output. The communication interface may perform or facilitate receipt and/or transmission wired or wireless communications via wired and/or wireless transceivers, including those making use of an audio jack/plug, a microphone jack/plug, a Universal Serial Bus (USB) port/plug, an Apple® Lightning® port/plug, an Ethernet port/plug, a fiber optic port/plug, a proprietary wired port/plug, a BLUETOOTH® wireless signal transfer, a BLUETOOTH® low energy (BLE) wireless signal transfer, an IBEACON® wireless signal transfer, a Radio-Frequency Identification (RFID) wireless signal transfer, Near-Field Communications (NFC) wireless signal transfer, Dedicated Short Range Communication (DSRC) wireless signal transfer, 802.11 Wi-Fi® wireless signal transfer, Wireless Local Area Network (WLAN) signal transfer, Visible Light Communication (VLC) signal transfer, Worldwide Interoperability for Microwave Access (WiMAX), Infrared (IR) communication wireless signal transfer, Public Switched Telephone Network (PSTN) signal transfer, Integrated Services Digital Network (ISDN) signal transfer, 3G/4G/5G/LTE cellular data network wireless signal transfer, ad-hoc network signal transfer, radio wave signal transfer, microwave signal transfer, infrared signal transfer, visible light signal transfer signal transfer, ultraviolet light signal transfer, wireless signal transfer along the electromagnetic spectrum, or some combination thereof.

Communication interface 540 may also include one or more Global Navigation Satellite System (GNSS) receivers or transceivers that are used to determine a location of the computing system 500 based on receipt of one or more signals from one or more satellites associated with one or more GNSS systems. GNSS systems include, but are not limited to, the US-based Global Positioning System (GPS), the Russia-based Global Navigation Satellite System (GLONASS), the China-based BeiDou Navigation Satellite System (BDS), and the Europe-based Galileo GNSS. There is no restriction on operating on any particular hardware arrangement, and therefore the basic features here may easily be substituted for improved hardware or firmware arrangements as they are developed.

Storage device 530 can be a non-volatile and/or non-transitory and/or computer-readable memory device and can be a hard disk or other types of computer readable media which can store data that are accessible by a computer, such as magnetic cassettes, flash memory cards, solid state memory devices, digital versatile disks, cartridges, a floppy disk, a flexible disk, a hard disk, magnetic tape, a magnetic strip/stripe, any other magnetic storage medium, flash memory, memristor memory, any other solid-state memory, a Compact Disc (CD) Read Only Memory (CD-ROM) optical disc, a rewritable CD optical disc, a Digital Video Disk (DVD) optical disc, a Blu-ray Disc (BD) optical disc, a holographic optical disk, another optical medium, a Secure Digital (SD) card, a micro SD (microSD) card, a Memory Stick® card, a smartcard chip, a EMV chip, a Subscriber Identity Module (SIM) card, a mini/micro/nano/pico SIM card, another Integrated Circuit (IC) chip/card, Random-Access Memory (RAM), Atatic RAM (SRAM), Dynamic RAM (DRAM), Read-Only Memory (ROM), Programmable ROM (PROM), Erasable PROM (EPROM), Electrically Erasable PROM (EEPROM), flash EPROM (FLASHEPROM), cache memory (L1/L2/L3/L4/L5), Resistive RAM (RRAM/ReRAM), Phase Change Memory (PCM), Spin Transfer Torque RAM (STT-RAM), another memory chip or cartridge, and/or a combination thereof.

Storage device 530 can include software services, servers, services, etc., that when the code that defines such software is executed by the processor 510, it causes the system 500 to perform a function. In some embodiments, a hardware service that performs a particular function can include the software component stored in a computer-readable medium in connection with the necessary hardware components, such as processor 510, connection 505, output device 535, etc., to carry out the function.

Embodiments within the scope of the present disclosure may also include tangible and/or non-transitory computer-readable storage media or devices for carrying or having computer-executable instructions or data structures stored thereon. Such tangible computer-readable storage devices can be any available device that can be accessed by a general purpose or special purpose computer, including the functional design of any special purpose processor as described above. By way of example, and not limitation, such tangible computer-readable devices can include RAM, ROM, EEPROM, CD-ROM or other optical disk storage, magnetic disk storage or other magnetic storage devices, or any other device which can be used to carry or store desired program code in the form of computer-executable instructions, data structures, or processor chip design. When information or instructions are provided via a network or another communications connection (either hardwired, wireless, or combination thereof) to a computer, the computer properly views the connection as a computer-readable medium. Thus, any such connection is properly termed a computer-readable medium. Combinations of the above should also be included within the scope of the computer-readable storage devices.

Computer-executable instructions include, for example, instructions and data which cause a general-purpose computer, special purpose computer, or special purpose processing device to perform a certain function or group of functions. Computer-executable instructions also include program modules that are executed by computers in stand-alone or network environments. Generally, program modules include routines, programs, components, data structures, objects, and the functions inherent in the design of special-purpose processors, etc. that perform tasks or implement abstract data types. Computer-executable instructions, associated data structures, and program modules represent examples of the program code means for executing steps of the methods disclosed herein. The sequence of such executable instructions or associated data structures represents examples of corresponding acts for implementing the functions described in such steps.

Other embodiments of the disclosure may be practiced in network computing environments with many types of computer system configurations, including personal computers, hand-held devices, multi-processor systems, microprocessor-based or programmable consumer electronics, network Personal Computers (PCs), minicomputers, mainframe computers, and the like. Embodiments may also be practiced in distributed computing environments where tasks are performed by local and remote processing devices that are linked (either by hardwired links, wireless links, or by a combination thereof) through a communications network. In a distributed computing environment, program modules may be located in both local and remote memory storage devices. Various modifications and changes may be made to the principles described herein without following the example embodiments and applications illustrated and described herein, and without departing from the spirit and scope of the disclosure.

Claim language or other language in the disclosure reciting "at least one of" a set and/or "one or more" of a set indicates that one member of the set or multiple members of the set (in any combination) satisfy the claim. For example, claim language reciting "at least one of A and B" or "at least one of A or B" means A, B, or A and B. In another example, claim language reciting "at least one of A, B, and C" or "at least one of A, B, or C" means A, B, C, or A and B, or A and C, or B and C, or A and B and C. The language "at least one of" a set and/or "one or more" of a set does not limit the set to the items listed in the set. For example, claim language reciting "at least one of A and B" or "at least one of A or B" can mean A, B, or A and B, and can additionally include items not listed in the set of A and B.

What is claimed is:

1. An apparatus comprising:

at least one processor; and at least one memory coupled to the at least one processor and storing instructions that, when executed by the at least one processor, cause the at least one processor to:

receive a plurality of Light Detection and Ranging (LiDAR) points corresponding with a real-world object;

down sample the plurality of LiDAR points based on an object distance metric by taking every Nth sample;

determine, for each of the down sampled plurality of LiDAR points, an image texture based on the real-world object;

generate a surfel object representing the real-world object, wherein the surfel object is based on the down sampled plurality of LiDAR points and the image texture determined for each of the down sampled plurality of LiDAR points; and insert the surfel object into a simulated three-dimensional (3D) environment.

2. The apparatus of claim 1, wherein the simulated 3D environment comprises one or more geometrically complete 3D objects.

3. The apparatus of claim 1, wherein the simulated 3D environment comprises a simulated autonomous vehicle (AV).

4. The apparatus of claim 3, wherein the simulated AV is configured to collect synthetic LiDAR data associated with the surfel object, and wherein the synthetic LiDAR data corresponds with the plurality of LiDAR points.

5. The apparatus of claim 1, wherein generating the surfel object representing the real-world object comprises determining, for each of the down sampled plurality of LiDAR points, a normal vector associated with a corresponding surface location on the real-world object.

6. The apparatus of claim 1, wherein the instructions also cause the at least one processor to:

receive a second plurality of LiDAR points corresponding with a second real-world object; and not represent the second real-world object in the simulated 3D environment as a second surfel object when at least one of:

a distance to the second real-world object satisfies a distance threshold;

an amount of noise in the second plurality of LiDAR points satisfies a noise threshold; or a number of LiDAR points associated with the second real-world object does not satisfy a number of points threshold.

7. The apparatus of claim 1, wherein determining, for each of the down sampled plurality of LiDAR points, the image texture based on the real-world object comprises determining, for each of the down sampled plurality of LiDAR points, a color value associated with the image texture for the LiDAR point.

8. A computer-implemented method comprising:

receiving a plurality of Light Detection and Ranging (LiDAR) points corresponding with a real-world object;

down sampling the plurality of LiDAR points based on an object distance metric by taking every Nth sample;

determining, for each of the down sampled plurality of LiDAR points, an image texture based on the real-world object;

generating a surfel object representing the real-world object, wherein the surfel object is based on the down sampled plurality of LiDAR points and the image texture determined for each of the down sampled plurality of LiDAR points; and inserting the surfel object into a simulated three-dimensional (3D) environment.

9. The computer-implemented method of claim 8, wherein the simulated 3D environment comprises one or more geometrically complete 3D objects.

10. The computer-implemented method of claim 8, wherein the simulated 3D environment comprises a simulated autonomous vehicle (AV).

11. The computer-implemented method of claim 10, wherein the simulated AV is configured to collect synthetic LiDAR data associated with the surfel object, and wherein the synthetic LiDAR data corresponds with the plurality of LiDAR points.

12. The computer-implemented method of claim 8, wherein generating the surfel object representing the real-world object comprises determining, for each of the down sampled plurality of LiDAR points, a normal vector associated with a corresponding surface location on the real-world object.

13. The computer-implemented method of claim 8, further comprising:

receiving a second plurality of LiDAR points corresponding with a second real-world object; and not representing the second real-world object in the simulated 3D environment as a second surfel object when at least one of:

a distance to the second real-world object satisfies a distance threshold;

an amount of noise in the second plurality of LiDAR points satisfies a noise threshold; or a number of LiDAR points associated with the second real-world object does not satisfy a number of points threshold.

14. The computer-implemented method of claim 8, wherein determining, for each of the down sampled plurality of LiDAR points, the image texture based on the real-world object comprises determining, for each of the down sampled plurality of LiDAR points, a color value associated with the image texture for the LiDAR point.

15. A non-transitory computer-readable storage medium comprising at least one instruction for causing a computer or processor to:

receive a plurality of Light Detection and Ranging (LiDAR) points corresponding with a real-world object;

down sample the plurality of LiDAR points based on an object distance metric by taking every Nth sample;

determine, for each of the down sampled plurality of LiDAR points, an image texture based on the real-world object;

generate a surfel object representing the real-world object, wherein the surfel object is based on the down sampled plurality of LiDAR points and the image texture determined for each of the down sampled plurality of LiDAR points; and insert the surfel object into a simulated three-dimensional (3D) environment.

16. The non-transitory computer-readable storage medium of claim 15, wherein the simulated 3D environment comprises one or more geometrically complete 3D objects.

17. The non-transitory computer-readable storage medium of claim 15, wherein the simulated 3D environment comprises a simulated autonomous vehicle (AV).

18. The non-transitory computer-readable storage medium of claim 17, wherein the simulated AV is configured to collect synthetic LiDAR data associated with the surfel object, and wherein the synthetic LiDAR data corresponds with the plurality of LiDAR points.

19. The non-transitory computer-readable storage medium of claim 15, wherein generating the surfel object representing the real-world object comprises, determining, for each of the down sampled plurality of LiDAR points, a normal vector associated with a corresponding surface location on the real-world object.

20. The non-transitory computer-readable storage medium of claim 15, wherein the at least one instruction also causes the computer or the processor to:

receive a second plurality of LiDAR points corresponding with a second real-world object; and not represent the second real-world object in the simulated 3D environment as a second surfel object when at least one of:

a distance to the second real-world object satisfies a distance threshold;

an amount of noise in the second plurality of LiDAR points satisfies a noise threshold; or a number of LiDAR points associated with the second real-world object does not satisfy a number of points threshold.

* * * * *